| United States Patent [19] | [11] | 4,190,700 |
|---|---|---|
| Anderson et al. | [45] | Feb. 26, 1980 |

[54] HIGH SOLIDS THERMOSETTABLE COATING COMPOSITIONS CONTAINING 1,4-DIMETHYLOLCYCLOHEXANE AND POLYOXYPROPYLENE POLYOL

[75] Inventors: George J. Anderson; J. Owen Santer, both of East Longmeadow; Timothy F. Desmond, Winchester, all of Mass.

[73] Assignee: Monsanto Company, St. Louis, Mo.

[21] Appl. No.: 905,700

[22] Filed: May 15, 1978

[51] Int. Cl.$^2$ .............................................. C08L 61/24
[52] U.S. Cl. ................................ 428/524; 427/388 B; 428/460; 525/515; 528/261
[58] Field of Search ........................ 260/849; 528/261; 428/524

[56] References Cited

U.S. PATENT DOCUMENTS

| 3,907,740 | 9/1975 | Blank | 260/33.4 R |
|---|---|---|---|
| 3,959,201 | 5/1976 | Chang | 260/850 |
| 3,959,202 | 5/1976 | Blank | 260/851 |
| 3,960,983 | 6/1976 | Blank | 260/849 |
| 4,119,762 | 10/1978 | Anderson et al. | 260/849 |

Primary Examiner—Carman J. Seccuro
Attorney, Agent, or Firm—R. Bruce Blance; William J. Farrington; S. M. Tarter

[57] ABSTRACT

Coating compositions comprising an alkylated urea-formaldehyde resin, a polymethylolcyclohexane and a polyoxypropylene polyol which are useful for low temperature cure and are low in viscosity to allow ease of coating without the need for appreciable amounts of solvent thinners. The alkylated urea-formaldehyde condensates have an average degree of condensation of about 3 or less and a combined urea:formaldehyde:alcohol ratio in the range of about 1:2–3:1–2.5. The compositions may be cured in the presence of acid catalysts in the temperature range of 70° to 105° C., and are particularly useful for coating paper, cloth and wood substrates.

23 Claims, No Drawings

HIGH SOLIDS THERMOSETTABLE COATING COMPOSITIONS CONTAINING 1,4-DIMETHYLOLCYCLOHEXANE AND POLYOXYPROPYLENE POLYOL

This invention relates to thermosetting coating compositions comprising a closed chain polyol, an alkylated ureaformaldehyde resin and a polyoxypropylene polyol and in particular relates to coating compositions comprising a polymethylolcyclohexane, a substantially fully alkylated low molecular weight urea-formaldehyde condensate and a polyoxypropylene polyol.

Coating compositions comprising hydroxy polyesters and similar hydroxy containing oligomers and polymers and aminoplast curing agents are well known in the prior art. In general these compositions are cured at temperatures well in excess of 100° C. and encompass enormously wide ranges of hydroxy polyester to aminoplast. Moreover, they are generally high in viscosity and therefore require some water or solvent to reduce the viscosity to a level adequate for coating applications.

Coating compositions of suitable viscosity for coating applications may be prepared from monomeric polyols and urea-formaldehyde resins. The cured compositions, however, lack hardness, solvent resistance or water resistance especially when they contain a high ratio of urea-formaldehyde resin or are cured at low temperatures. Also, many such compositions, are cured at low temperaures. Also, many such compositions, when they are applied as coatings to substrates, tend to crawl and form coatings of non-uniform thickness, and also tend to form craters and "orange peel" defects when they are cured.

The coating compositions of the present invention are liquid compositions comprising a polymethylolcyclohexane containing from 2 to 4 methylol groups, an alkylated ureaformaldehyde condensate of average degree of condensation of about 3 or less, alkylated with a $C_1$ to $C_4$ alcohol wherein the molar ratio of urea:formaldehyde:alcohol of the alkylated ureaformaldehyde condensate is in the range of about 1:2-3:1.0-2.5, and a polyoxypropylene polyol of molecular weight in the range of about 500 to 1000. The weight ratio of polyoxypropylene polyol to polymethylolcyclohexane in the liquid composition is less than about 6:1 and the ratio of the polyol components to urea-formaldehyde condensate is such that the ratio of hydroxyl groups of the polyols to methoxyl groups of the urea-formaldehyde condensate is in the range of about 1:0.7 to about 1:2.5. An acid catalyst may be added to the compositions to enhance the rate of curing of the compositions.

Other aspects of the invention are directed to substrates coated with a cured film of the coating compositions and to a process of coating a substrate by applying to it a coating composition of the present invention and curing the coating at an elevated temperature. An advantage of the present compositions resides in their high concentration, up to 100 percent of reactive components which are converted by the curing step of solid resin; hence they can be used substantially free of solvent because of their low viscosity to provide high film build per application and reduce the amount of volatile pollutants evolved during the baking cycle. Because they are readily cured at low temperatures especially when they are catalyzed with acid, they reduce the thermal energy needed for cure and improve the economics of the coating process. Furthermore, they provide hard smooth glossy films which are substantially free from the problems of crawling, cratering, pinhole formation and orange peel formation and which possess good solvent and water resistance. The compositions are sufficiently stable at ambient temperature that they can be shipped at "100 percent solids" even when they contain acid catalyst; hence they can reduce shipping and handling costs.

The polymethylolcyclohexane component of the compositions is a closed-chain polyol containing from two to four methylol groups per molecule. It may be prepared by hydrogenation of a benzene polycarboxylic acid or benzene polycarboxylic acid ester. The polymethylolcyclohexane is selected from the group consisting of 1,2-dimethylolcyclohexane, 1,3-dimethylolcyclohexane, 1,4-dimethylolcyclohexane, 1,2,3-trimethylolcyclohexane, 1,2,4-trimethylolcyclohexane, 1,3,5-trimethylolcyclohexane, and 1,2,4,5-tetramethylolcyclohexane. Preferred polymethylolcyclohexanes include 1,3-dimethylolcyclohexane, 1,4-dimethylolcyclohexane and 1,3,5-trimethylolcyclohexane. An especially preferred polymethylolcyclohexane is 1,4-dimethylolcyclohexane, since it is available commercially, and is low melting and compatible with the alkylated ureaformaldehyde condensate over a wide concentration range.

The alkylated urea-formaldehyde component of the liquid composition of the present invention is prepared in the conventional manner by reaction of urea and formaldehyde under alkaline conditions followed by etherification with a $C_1$ to $C_4$ alcohol such as methanol or butanol under acid conditions to provide a condensate with an average degree of condensation of about 3 or less and a urea:formaldehyde:alkanol ratio in the range of about 1:2-3:1-2.5. Preferably the ratio is in the range of about 1:2.2-2.8:1.3-2.2 and the ratio of formaldehyde:alkanol is at least about 1.1. The preferred alkanol is methanol since it enhances the low temperature curing potential of the coating compositions and reduces the amount of volatile material generated by the thermosetting reaction. When the ratio of reacted methanol to urea of the methylated urea-formaldehyde condensate is less than about 1.0 the coating composition is undesirably slow in thermosetting and the resulting films are comparatively solvent and water sensitive.

For improved flexibility of the cured composition, a polyoxypropylene polyol containing from 3 to 6 hydroxyls per molecule, of molecular weight in the range of 500 to 1000 is included as a component of the liquid compositions of the present invention. The polyoxypropylene polyols may be prepared by the base catalyzed addition of propylene oxide to polyols such as trimethylolethane, trimethylolpropane, glycerol, 1,2,6-hexanetriol, pentaerythritol, sorbitol, and the like. The polyoxypropylene polyols can also serve to reduce the viscosity of the uncured composition and thus improve its coatability or sprayability. For these purposes, the weight ratio of polyoxypropylene polyol to polymethylolcyclohexane is generally less than about 6:1 and is preferably in the range of about 4:1 to about 1:6 with the ratio of hydroxy groups of the polymethylolcyclohexane and polyol to alkoxymethyl groups of the ureaformaldehyde condensate in the range of about 1:0.7 to about 1:2.5. In general, when the ratio of hydroxy groups to alkoxymethyl groups is at the upper end of the range, the ratio of polyol to polymethylolcyclohexane is preferably also at the upper end of its range, and conversely when the ratio of hydroxy groups to alkoxymethyl groups is at the lower end of the range, the ratio of polyol to polymethylolcyclohexane is preferably also at the lower end of its range. Large excesses and deficiencies of urea-formaldehyde condensate have been acceptable in the prior art solvent systems without detracting from film properties of the cured composition. However, when insufficient or excess urea-formaldehyde condensate is used with the polyols of the present invention, the cured liquid composition is found to be undesirably soft and readily marred.

The liquid compositions of the present invention can be cured at temperatures in the range of about 50° to about 175° C. for a period of time in the range of several seconds to hours. Curing is readily effected in about 10 to 30 minutes at the lower end of the temperature range in the presence of an acid catalyst which is soluble in the liquid composition and has a pKa at 25° C. of less than about 5. Among the acids which can be used are acids such as sulfuric acid, phosphoric acid, butylphosphoric acid and sulfonic acids such as methanesulfonic acid, benzenesulfonic acid, and the toluenesulfonic acids. A preferred catalyst is p-toluenesulfonic acid since it is readily available, relatively non-volatile and easily dissolved in the liquid composition. Sufficient catalyst to provide the desired rate of cure at a selected temperature without causing excessively short pot-life is used. Generally from about 0.1 to about 10 percent is sufficient. For a satisfactory cure rate in the temperature range of about 60° to about 105° C., from about 0.2 to about 1 percent of catalyst provides undiluted liquid compositions with a pot-life or shelf-stability of seven (7) days or more at 25° C. Dilution with solvent can extend the storage stability almost indefinitely.

An important property of the compositions of the present invention is their excellent fluidity at "high solids" content. As a result the compositions can be applied to paper, cloth, metal, wood, glass and plastic substrates by any convenient method such as brushing, dipping, spray, roller coating, dip coating, etc. The ability to cure at low temperature is particularly advantageous with paper, cloth and wood substrates and very glossy flexible coatings can be obtained on such substrates. The term "high solids" is used to indicate that the compositions of the present invention contain at least about 70 weight percent of reactive components which are converted by the curing step into solid resin, and contain at most about 30 weight percent of solvent.

In addition to the above components, the compositions can contain other optional ingredients including polymers which react with the alkylated urea-formaldehyde resin, such as hydroxy-polyesters, hydroxy-acrylic resins and the like, adhesion promoters such as epoxy resins, and other agents of the type ordinarily used in surface coatings such as various pigments, fillers, plasticizers, antioxidants, flow control agents and wetting agents.

The invention will be further described and illustrated in the examples which follow. The examples are illustrative of the invention and should not be construed as limiting the scope to their details. All parts and percentages are by weight unless otherwise indicated.

EXAMPLE 1

30 Parts of 1,4-dimethylolcyclohexane are melted at 50° C. and blended with 70 parts of a methylated urea-formaldehyde condensate in which the urea to combined formaldehyde ratio is 1:2.6 and the methoxyl content is 12.8 meq per gram. The blend is cooled to room temperature and 0.7 part of p-toluenesulfonic acid are added as a 20 percent solution in isopropyl alcohol. The blend is applied to a bonderized No. 37 steel panel with a 75 micron coating blade to provide a dried film thickness of approximately 35 microns after a 20 minute bake at 82° C. The film is smooth and glossy and shows little cratering or orange peel effect. It has a pencil hardness rating of HB, a solvent resistance of 200+ rubs and after 15 minutes in contact with a drop of water, it shows only slight softening and swelling. The solvent resistance is determined by oscillating a Control-Flow Fountain Marking Pencil manufactured by Diagraph-Bradley Industries, Inc., containing a felt tip of approximately 1 cm diameter and filled with methyl ethyl ketone, on the coating surface using a uniform moderate pressure. The number of double strokes required to erode the film and cause break through to the metal is noted. The water spot test is carried out by adding a 0.05 ml drop of distilled water to the surface of the coating and covering the spot with a watch glass. After a period of time at room temperature the water is removed and the spot is examined for softening, blistering, swelling, whitening and separation from the substrate.

EXAMPLES 2 and 3

Similar coatings are prepared from blends of the methoxymethylurea resin of Example 1 and propylene glycol and 1,4-cyclohexanediol. Curing is effected at 82° C. The compositions and coating data are presented in Table 1 together with the data for Example 1.

In the preparation of coating compositions with 1,4-cyclohexanediol, a 50 percent solution of the diol in methyl alcohol is used because the high melting point of the diol prevents solution in methoxymethylurea resin at the low temperature necessary to avoid premature curing. Because of this, "high solids" compositions are not readily obtained and the coating blends tend to spread and puddle and give very uneven coatings.

The data show superior coating appearance, superior water spot resistance and at the lower p-toluenesulfonic acid concentration, superior solvent resistance of the coating compositions containing 1,4-dimethylolcyclohexane.

TABLE 1

| POLYOL - UREA AMINOPLAST COATINGS | | | | | | |
|---|---|---|---|---|---|---|
| | Example 1 | | Example 2 | | Example 3 | |
| | A | B | A | B | A | B |
| Composition, pbw | | | | | | |
| Methoxymethylurea resin | 70 | 70 | 70 | 70 | 70 | 70 |
| 1,4-dimethylolcyclohexane | 30 | 30 | — | — | — | — |
| dipropylene glycol | — | — | 30 | 30 | — | — |
| 1,4-cyclohexane diol | — | — | — | — | 30 | 30 |
| p-toluenesulfonic acid | 0.7 | 0.5 | 0.7 | 0.5 | 0.7 | 0.5 |
| Coating Appearance | smooth, glossy | | film spread, | | uneven cratered | |

TABLE 1-continued
POLYOL - UREA AMINOPLAST COATINGS

| | Example 1 | | Example 2 | | Example 3 | |
|---|---|---|---|---|---|---|
| | A | B | A | B | A | B |
| | | slight cratering | uneven coating | | | |
| Film Properties | | | | | | |
| Pencil hardness | HB | HB | HB | B-HB | HB | HB |
| Solvent resistance (no. of rubs) | 200+ | 200+ | 200+ | 200 | 200+ | 65 |
| Water spot, 15 minutes | | slight damage | complete failure | | complete failure | |

EXAMPLES 4-10

A series of liquid composition blends is prepared with 1,4-dimethylolcyclohexane and the methoxymethylurea resin of Example 1. The various blends contain different ratios of hydroxyl groups of the diol to methoxymethyl groups of the urea compound. The blends are coated on bonderized No. 37 steel panels and cured at 82° C. for 20 minutes. The data show that the hardness, solvent resistance and water resistance, noted as the time for blistering and softening, decline when the ratio of methoxyl to hydroxyl is outside the range of about 2.5:1 to 0.70:1.

TABLE 2
EFFECT OF RATIO OF MeO to OH ON COATING PROPERTIES

| | Example 4 | Example 5 | Example 6 | Example 7 | Example 8 | Example 9 | Example 10 |
|---|---|---|---|---|---|---|---|
| Methoxymethyl urea | 75 | 70 | 65 | 55 | 45 | 40 | 35 |
| 1,4-dimethylolcyclohexane | 25 | 30 | 35 | 45 | 55 | 60 | 65 |
| p-toluenesulfonic acid | 0.7 | 0.7 | 0.7 | 0.7 | 0.7 | 0.7 | 0.7 |
| MeO:OH | 2.77 | 2.15 | 1.71 | 1.13 | 0.76 | 0.62 | 0.50 |
| Coating Properties | | | | | | | |
| Pencil hardness | HB | HB | F | F | F | B | 4B |
| Solvent resistance (no. of rubs) | 200+ (scored) | 200+ (slightly scored) | 200+ | 200+ | 200+ (slightly soft) | 75 | 30 |
| Water spot test | | | | | | | |
| time (minutes) | 5 | 10 | 10 | 25 | 25 | 10 | 5 |
| appearance | blistered | blistered | soft | soft | soft | soft | soft |

EXAMPLE 11

A blend of 70 parts of the methoxymethylurea resin of Example 1, 30 parts dimethylolcyclohexane and 3 parts p-toluenesulfonic acid is coated on magazine stock to give a coating of about 6 mirons in thickness. The coating is cured for 1 minute at 82° C. A smooth, glossy, non-blocking coating is obtained.

EXAMPLES 12-14

A series of liquid blends containing the methoxymethylurea resin of Example 1, a diol and a polyoxypropylene triol is prepared. The polyoxypropylene triol has a hydroxyl equivalent of 233 and is the reaction product of 1,2,6-hexane triol and propylene oxide. It reduces the viscosity and improves the coatability of the blends without inducing film spread. The coatings are cast on bonderized No. 37 steel panels cured for 20 minutes at 82° C. and evaluated for water and solvent resistance. The data presented in Table 3 show that the coating containing 1,4-dimethylolcyclohexane is superior in water resistance to coatings containing dipropylene glycol or 1,4-cyclohexanediol. Because of its high melting point and insolubility, 1,4-cyclohexanediol was dissolved in methanol and used as a 50 percent solution in the preparation of its blends.

TABLE 3
COATINGS PREPARED FROM METHOXYMETHYLUREA, DIOL AND POLYOXYPROPYLENE TRIOL

| | Example 12 | Example 13 | Example 14 |
|---|---|---|---|
| Composition, pbw | | | |
| Methoxymethylurea resin | 65 | 65 | 65 |
| 1,4-dimethylolcyclohexane | 21 | — | — |
| dipropylene glycol | — | 21 | — |
| 1,4-cyclohexanediol | — | — | 21 |
| polyoxypropylene triol | 14 | 14 | 14 |
| p-toluenesulfonic acid | 0.7 | 0.7 | 0.7 |
| Coating Appearance | smooth, glossy | smooth, glossy | smooth, glossy |
| (33 microns in thickness) | | | |
| Film Properties | | | |
| Pencil hardness | F | F | H |
| Solvent resistance, (no of rubs) | 200+ (scored) | 200+ (scored) | 200+ |
| Water Spot, 5 minutes | softened | blistered and separated from substrate | blistered and separated from substrate |

EXAMPLES 15-20

A series of liquid blends containing the methoxymethylurea resin of Example 1, 1,4-dimethylolcyclohexane and the polyoxypropylene triol of Example 12 is prepared. The blends are coated on bonderized No. 37 steel panels and cured for 20 minutes at 82° C. to provide films of 35 microns in thickness. The cured films are evaluated for solvent and water resistance. The data in Table 4 show that with increase in the ratio of polyoxypropylene triol to 1,4-dimethylolcyclohexane, the hardness and water resistance of the coated film declines.

TABLE 4

COATINGS FROM BLENDS OF METHOXYMETHYLUREA, 1,4-DIMETHYLOLCYCLOHEXANE AND POLYOXYPROPYLENE TRIOL

| | Example 15 | Example 16 | Example 17 | Example 18 | Example 19 | Example 20 |
|---|---|---|---|---|---|---|
| Composition, pbw | | | | | | |
| methoxymethylurea resin | 65 | 65 | 65 | 65 | 65 | 65 |
| 1,4-dimethylolcyclohexane | 35 | 30 | 25 | 15 | 5 | — |
| polyoxypropylene triol | — | 5 | 10 | 20 | 30 | 35 |
| p-toluenesulfonic acid | 0.7 | 0.7 | 0.7 | 0.7 | 0.7 | 0.7 |
| Coating Appearance | smooth glossy | smooth glossy | smooth glossy | smooth glossy | smooth glossy | smooth glossy |
| Film Properties | | | | | | |
| Pencil hardness | F | F | F | HB | HB | HB |
| Solvent resistance (no. of rubs) | 200+ | 200+ | 200+ | 200+ | 200+ | 200+ |
| Water spot, 5 minutes | slight softening | soft | soft | very soft | very soft | blistered, separated from substrate |

A blend containing 70 parts of the methoxymethylurea resin of Example 1, 30 parts of 1,4-dimethylolcyclohexane, 200 parts of a polyester resin of acid number 8 and hydroxyl number 60, and 0.7 part of p-toluenesulfonic acid is prepared. The blend is coated onto a bonderized No. 37 steel panel and cured for 20 minutes at 82° C. to give a uniform, smooth, glossy film 28 microns thick. The film has a pencil hardness of HB and a solvent resistance value of 200. A similar film prepared from a blend of methoxymethylurea and polyester resin without the 1,4-dimethylolcyclohexane is dull and less glossy.

What is claimed is:

1. A liquid composition comprising 1,4-dimethylolcyclohexane, a polyoxypropylene polyol containing from about 3 to about 6 hydroxyls per molecule, of molecular weight in the range of about 500 to about 1000 and an alkylated urea-formaldehyde condensate of average degree of condensation of about 3 or less, alkylated with a $C_1$ to $C_4$ alcohol, wherein the molar ratio of urea:formaldehyde:alcohol of the alkylated ureaformaldehyde condensate is in the range of about 1:2–3:1–2.5, wherein the weight ratio of polyoxypropylene polyol to 1,4-dimethylolcyclohexane is less than about 6:1, and wherein the ratio of hydroxyl groups of the 1,4-dimethylolcyclohexane and the polyoxypropylene polyol to alkoxymethyl groups of the alkylated urea-formaldehyde condensate is in the range of about 1:0.7 to about 1:2.5.

2. The composition of claim 1 wherein the alcohol is methyl alcohol.

3. The composition of claims 1 or 2 wherein the polyoxypropylene polyol is a propylene oxide adduct of a polyol selected from the group consisting of trimethylolethane, trimethylolpropane, glycerol, 1,2,6-hexanetriol, pentaerythritol and sorbitol.

4. The composition of claim 3 wherein the weight ratio of polyoxypropylene polyol to 1,4-dimethylolcyclohexane is in the range of about 4:1 to about 1:6.

5. The composition of claim 4 wherein the polyoxypropylene polyol is the propylene oxide adduct of 1,2,6-hexanetriol.

6. A liquid composition comprising 1,4-dimethylolcyclohexane, a polyoxypropylene polyol containing from about 3 to about 6 hydroxyls per molecule, of molecular weight in the range of about 500 to 1000, an alkylated ureaformaldehyde condensate and from about 0.1 to about 10 weight percent of a soluble acid catalyst of pKa less than about 5, wherein the alkylated urea-formaldehyde condensate has an average degree of condensation of about 3 or less, a molar ratio of urea:formaldehyde-alkylating alcohol in the range of about 1:2–3:1–2.5 and the alkylating alcohol is a $C_1$ to $C_4$ alcohol, wherein the weight ratio of polyoxypropylene polyol to 1,4-dimethylolcyclohexane is less than about 6:1 and wherein the ratio of hydroxyl groups of the 1,4-dimethylolcyclohexane and the polyoxypropylene polyol to alkoxymethyl groups of the alkylated urea-formaldehyde condensate is in the range of about 1:0.7 to about 1:2.5.

7. The composition of claim 6 wherein the alkylating alcohol is methyl alcohol.

8. The composition of claim 6 or 7 wherein the polyoxypropylene polyol is a propylene oxide adduct of a polyol selected from the group consisting of trimethylolethane, trimethylolpropane, glycerol, 1,2,6-hexanetriol, pentaerythritol and sorbitol.

9. The composition of claim 8 wherein the acid catalyst is a sulfonic acid.

10. The composition of claim 8 wherein the weight ratio of polyoxypropylene polyol to 1,4-dimethylolcyclohexane is in the range of about 4:1 to about 1:6.

11. The composition of claim 10 wherein the polyoxypropylene polyol is the propylene oxide adduct of 1,2,6-hexanetriol.

12. An article of manufacture comprising a substrate coated with the cured liquid composition of claim 1 or 2.

13. An article of manufacture comprising a substrate coated with the cured liquid composition of claim 3.

14. An article of manufacture comprising a substrate coated with the cured liquid composition of claim 4.

15. An article of manufacture comprising a substrate coated with the cured liquid composition of claim 5.

16. An article of manufacture comprising a substrate coated with the cured liquid composition of claim 6 or 7.

17. An article of manufacture comprising a substrate coated with the cured liquid composition of claim 8.

18. An article of manufacture comprising a substrate coated with the cured liquid composition of claim 10.

19. An article of manufacture comprising a substrate coated with the cured liquid composition of claim 11.

20. A process of coating a substrate which comprises applying a film of the liquid composition of claim 6 to the substrate and curing the film at a temperature in the range of about 50° to about 175° C.

21. The process of claim 20 wherein the temperature is in the range of about 60° to about 105° C.

22. A process of coating a substrate which comprises applying a film of the liquid composition of claim 8 to the substrate and curing the film at a temperature in the range of about 50° to about 175° C.

23. The process of claim 22 wherein the temperature is in the range of about 60° to about 105° C.